United States Patent
Arnone et al.

(10) Patent No.: US 9,940,789 B2
(45) Date of Patent: Apr. 10, 2018

(54) CREDIT CONTRIBUTION METHOD FOR A HYBRID GAME

(71) Applicant: Gamblit Gaming, LLC, Glendale, CA (US)

(72) Inventors: Miles Arnone, Sherborn, MA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

(21) Appl. No.: 13/890,207

(22) Filed: May 8, 2013

(65) Prior Publication Data
US 2013/0252687 A1 Sep. 26, 2013

Related U.S. Application Data

(63) Continuation of application No. PCT/US2012/047250, filed on Jul. 18, 2012.

(60) Provisional application No. 61/572,649, filed on Jul. 18, 2011.

(51) Int. Cl.
*A63F 13/00* (2014.01)
*G07F 17/32* (2006.01)

(52) U.S. Cl.
CPC ...... *G07F 17/3258* (2013.01); *G07F 17/3276* (2013.01); *A63F 13/00* (2013.01)

(58) Field of Classification Search
CPC .................................................. G07F 17/3267
USPC .......................................................... 463/20
See application file for complete search history.

(56) References Cited

U.S. PATENT DOCUMENTS

| | | | |
|---|---|---|---|
| 5,413,357 A | 5/1995 | Schulze et al. | |
| 5,718,429 A | 2/1998 | Keller | |
| 5,785,592 A | 7/1998 | Jacobsen | |
| 6,050,895 A * | 4/2000 | Luciano et al. | 463/7 |
| 6,227,974 B1 | 5/2001 | Eilat | |
| 6,267,669 B1 | 7/2001 | Luciano | |
| 6,761,632 B2 | 7/2004 | Bansemer et al. | |

(Continued)

FOREIGN PATENT DOCUMENTS

| | | |
|---|---|---|
| JP | 2001300098 A | 10/2001 |
| JP | 2003000944 A | 1/2003 |

(Continued)

OTHER PUBLICATIONS itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.

(Continued)

*Primary Examiner* — James S McClellan
*Assistant Examiner* — Syvila Weatherford
(74) *Attorney, Agent, or Firm* — Caitlyn Ross

(57) ABSTRACT

Systems and methods for collecting a credit contribution for a hybrid game having an entertainment game portion and a gambling game portion are provided. In operation, a portion of real world credits committed or accumulated in the hybrid game are collected and the collected portion of real world credits is contributed to a pool via a credit tax management system, the pool for the purposes of contributing to an award for redemption of game world credit granted players for achieving a certain status in a hybrid game tournament.

11 Claims, 5 Drawing Sheets

(56) References Cited

U.S. PATENT DOCUMENTS

| | | |
|---|---|---|
| 6,761,633 B2 | 7/2004 | Riendeau |
| 6,764,397 B1 | 7/2004 | Robb |
| 6,811,482 B2 | 11/2004 | Letovsky |
| 7,118,105 B2 | 10/2006 | Benevento |
| 7,294,058 B1 | 11/2007 | Slomiany |
| 7,326,115 B2 | 2/2008 | Baerlocher |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,938,727 B1 | 5/2011 | Konkle |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,047,915 B2 | 11/2011 | Lyle |
| 8,060,829 B2 | 11/2011 | Jung et al. |
| 8,075,383 B2 | 12/2011 | Friedman et al. |
| 8,087,999 B2 | 1/2012 | Oberberger |
| 8,113,938 B2 | 2/2012 | Friedman et al. |
| 8,118,654 B1 | 2/2012 | Nicolas |
| 8,128,487 B2 | 3/2012 | Hamilton et al. |
| 8,135,648 B2 | 3/2012 | Oram |
| 8,137,193 B1 | 3/2012 | Kelly et al. |
| 8,157,653 B2 | 4/2012 | Buhr |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 2001/0004609 A1 | 6/2001 | Walker et al. |
| 2001/0019965 A1 | 9/2001 | Ochi |
| 2002/0022509 A1 | 2/2002 | Nicastro |
| 2002/0090990 A1 | 7/2002 | Joshi et al. |
| 2002/0160825 A1* | 10/2002 | Nicastro et al. ............... 463/16 |
| 2002/0175471 A1 | 11/2002 | Faith |
| 2003/0060286 A1 | 3/2003 | Walker et al. |
| 2003/0139214 A1 | 7/2003 | Wolf et al. |
| 2003/0171149 A1 | 9/2003 | Rothschild |
| 2003/0204565 A1 | 10/2003 | Guo et al. |
| 2004/0092313 A1 | 5/2004 | Saito et al. |
| 2004/0102238 A1 | 5/2004 | Taylor |
| 2004/0121839 A1 | 6/2004 | Webb |
| 2004/0225387 A1 | 11/2004 | Smith |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0239538 A1 | 10/2005 | Dixon |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0234791 A1 | 10/2006 | Nguyen et al. |
| 2006/0258433 A1 | 11/2006 | Finocchio et al. |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0117641 A1 | 5/2007 | Walker et al. |
| 2007/0129149 A1 | 6/2007 | Walker |
| 2007/0156509 A1 | 7/2007 | Jung et al. |
| 2007/0167212 A1 | 7/2007 | Nguyen |
| 2007/0167239 A1 | 7/2007 | O'Rourke |
| 2007/0191104 A1 | 8/2007 | Van Luchene |
| 2007/0203828 A1 | 8/2007 | Jung et al. |
| 2007/0293306 A1 | 12/2007 | Nee et al. |
| 2008/0004107 A1 | 1/2008 | Nguyen et al. |
| 2008/0015004 A1 | 1/2008 | Gatto et al. |
| 2008/0070659 A1* | 3/2008 | Naicker ........................ 463/12 |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1* | 5/2008 | Oberberger ............ G07F 17/32 463/16 |
| 2008/0108425 A1 | 5/2008 | Oberberger |
| 2008/0119283 A1 | 5/2008 | Baerlocher |
| 2008/0146308 A1 | 6/2008 | Okada |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0061974 A1 | 3/2009 | Lutnick et al. |
| 2009/0082093 A1 | 3/2009 | Okada |
| 2009/0088244 A1* | 4/2009 | Nicely et al. .................. 463/27 |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0176560 A1 | 7/2009 | Herrmann et al. |
| 2009/0176566 A1 | 7/2009 | Kelly |
| 2009/0247272 A1 | 8/2009 | Abe |
| 2009/0221355 A1 | 9/2009 | Dunaevsky et al. |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0035674 A1 | 2/2010 | Slomiany |
| 2010/0056247 A1 | 3/2010 | Nicely |
| 2010/0062836 A1 | 3/2010 | Young |
| 2010/0093420 A1 | 4/2010 | Wright |
| 2010/0120486 A1* | 5/2010 | DeWaal et al. ............... 463/16 |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0203940 A1 | 8/2010 | Alderucci et al. |
| 2010/0210344 A1 | 8/2010 | Edidin et al. |
| 2010/0227658 A1* | 9/2010 | Crowder et al. ................ 463/1 |
| 2010/0227672 A1 | 9/2010 | Amour |
| 2010/0227688 A1 | 9/2010 | Lee |
| 2010/0240436 A1 | 9/2010 | Wilson et al. |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gergon |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0111837 A1 | 5/2011 | Gagner |
| 2011/0117982 A1* | 5/2011 | Nguyen ................. G07F 17/32 463/16 |
| 2011/0118011 A1 | 5/2011 | Filipour et al. |
| 2011/0109454 A1 | 6/2011 | McSheffrey |
| 2011/0159940 A1* | 6/2011 | Acres ............................ 463/11 |

(56) References Cited

U.S. PATENT DOCUMENTS

| | | |
|---|---|---|
| 2011/0207523 A1 | 8/2011 | Filipour et al. |
| 2011/0218028 A1 | 8/2011 | Acres |
| 2011/0212766 A1 | 9/2011 | Bowers |
| 2011/0212767 A1 | 9/2011 | Barclay |
| 2011/0218024 A1* | 9/2011 | Baerlocher .................. 463/16 |
| 2011/0218033 A1* | 9/2011 | Englman et al. ............. 463/25 |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0244944 A1 | 10/2011 | Baerlocher |
| 2011/0263312 A1* | 10/2011 | De Waal et al. .............. 463/20 |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2012/0015702 A1* | 1/2012 | Amaitis et al. ............... 463/12 |
| 2012/0058814 A1 | 3/2012 | Lutnick |
| 2012/0077569 A1 | 3/2012 | Watkins |
| 2012/0108323 A1 | 5/2012 | Kelly |
| 2012/0202587 A1 | 8/2012 | Allen |
| 2012/0322545 A1 | 12/2012 | Arnone et al. |

FOREIGN PATENT DOCUMENTS

| | | |
|---|---|---|
| JP | 2003111980 A | 4/2003 |
| JP | 2003210825 A | 7/2003 |
| JP | 2004097610 A | 4/2004 |
| JP | 2004166746 A | 6/2004 |
| JP | 2007061472 A | 3/2007 |
| JP | 2010046134 A | 3/2010 |
| JP | 2010262389 A | 11/2010 |
| WO | 9851384 A1 | 11/1998 |
| WO | 2010087090 A1 | 8/2010 |
| WO | 2011109454 A1 | 9/2011 |
| WO | 2012078668 A1 | 6/2012 |
| WO | 2012139083 A1 | 10/2012 |
| WO | 2012167146 A1 | 12/2012 |
| WO | 2012167275 A2 | 12/2012 |
| WO | 2013009972 A1 | 1/2013 |
| WO | 2013010036 A1 | 1/2013 |

OTHER PUBLICATIONS

Changing the Virtual Self: Avatar Transformations in Popular Games; Barr et al., Victoria Univ., NZ, 2006.

Real-Time Multimodal Human—Avatar Interaction; Li et al., IEEE (Video Technology) vol. 18, No. 4, 2008.

International Search Report and Written Opinion, PCT/US2012/47250, dated Dec. 13, 2012.

Japan Patent Office, Office Action, Japan Patent Application No. 2014-521742, dated Mar. 21, 2017, Japan.

WIPO/IPEA International Preliminary Report on Patentability, PCT/US12/47250, dated Sep. 4, 2013.

* cited by examiner

CREDIT CONTRIBUTION METHOD FOR A HYBRID GAME

CROSS-REFERENCE TO RELATED APPLICATIONS

The current application is a continuation of Patent Cooperation Treaty Application No. PCT/US12/47250, filed on Jul. 18, 2012, which claims the benefit of U.S. Provisional Patent Application No. 61/572,649, filed Jul. 18, 2011, the contents of each of which are hereby incorporated by reference herein.

FIELD

The present disclosure is generally related to gaming and more specifically to monitoring and taxing a hybrid game that includes both a gambling game and an entertainment game.

BACKGROUND

The gaming machine manufacturing industry has traditionally developed gaming machines with a gambling game. A gambling game is typically a game of chance, which is a game where the outcome of the game is generally dependent on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

Entertainment games may include Digital Rights Management (DRM) components to ensure that unauthorized copies of an entertainment game are not being used. However, the operations of conventional entertainment games are not typically taxed in order to allow for credit contribution for tournaments or other types of additional gambling games. Therefore, the DRM components of an entertainment game typically do not provide the features that are used to monitor and collect a credit contribution.

SUMMARY

Systems and methods for collecting a credit contribution for a hybrid game having an entertainment game portion and a gambling game portion are provided. In some embodiments of the invention, a portion of real world credits committed or accumulated in the hybrid game are collected and the collected portion of real world credits is contributed to a pool via a credit tax management system, the pool for the purposes of contributing to an award for redemption of game world credit granted players for achieving a certain status in a hybrid game tournament.

In various embodiments, a credit tax function collects the portion of the real world credits and the credit tax function is included in the credit tax management system, and wherein the credit tax management system is coupled to a plurality of hybrid games.

In numerous embodiments, the portion of the real world credit collected is a percentage of real world credit wagered in the hybrid game and the percentage is taken directly.

In many embodiments, the real world credit collected is a percentage of real world credit wagered in the hybrid game and the percentage is taken by adjusting the odds tables of the gambling portion of the hybrid game.

In several embodiments, the portion of the real world credit collected is a percentage of real world credit won in the hybrid game.

In some embodiments, a percentage portion of game world credit is taken from the entertainment portion of the hybrid game.

In numerous embodiments, the portion of real world credit is taken on a periodic time basis.

In many embodiments, wherein the portion of real world credit is collected for use of the hybrid game for a certain period of time.

In several embodiments, wherein the portion of real world credit is a certain amount taken for a player to enter a tournament.

In numerous embodiments, wherein the portion of real world credit is a certain amount taken in order for a player to attempt a specific feat or action in the entertainment game portion of the hybrid game.

In many embodiments, the portion of real world credit is a fixed amount of real world credit, in addition to the amount of real world credit wagered in the gambling game portion of the hybrid game, in order for a player to place a bet, in a virtual casino in the entertainment game portion of the hybrid game.

DETAILED DESCRIPTION

Figure 1:
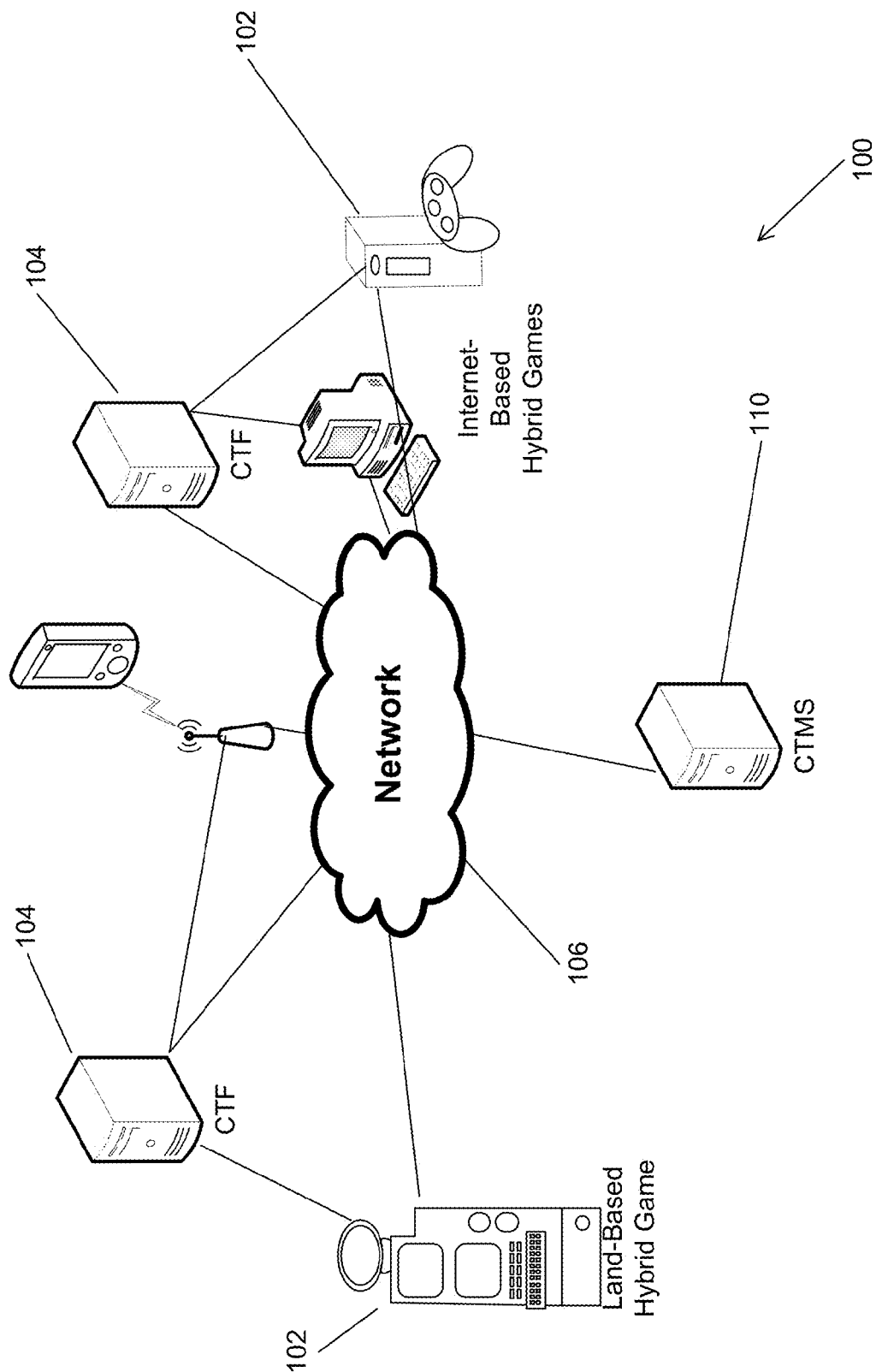
FIG. 1 illustrates a system diagram of a credit tax function system for collecting credit contributions form hybrid games in accordance with an embodiment of the invention.

Turning now to the drawings, systems and methods for a hybrid game including a credit tax function module are illustrated. In many embodiments, the credit tax function module enables credit contribution from the hybrid game by monitoring the amount of real world credits and game world credits that are committed, gained or lost by a player playing a hybrid game. In several embodiments, a hybrid game is a game that integrates both a gambling game that includes a real world engine (RWE) which manages the gambling portion of a game, as well as an entertainment game that includes a game world engine (GWE) that manages the entertainment portion of a game, and an entertainment software engine (ESE) that executes the game for user entertainment. In certain embodiments, the hybrid game also includes a user interface associated with either or both the gambling game and the entertainment game. Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety. The RWE, GWE and ESE are also discussed further below.

The credit tax function module can monitor a hybrid game through tap points from which the credit tax function module can collect data about the hybrid game. The tap points can capture data from the hybrid game at any point of operation within the hybrid game. In several embodiments, the credit tax function module is part of a credit contribution system that monitors and controls several credit tax function modules.

System architectures for a hybrid game regulated by a credit tax function module in accordance with various embodiments are discussed further below.

Systems for Credit Contribution Hybrid Games

In many embodiments, a hybrid game provides players with high levels of entertainment content with a game of skill in their gambling experience. These hybrid games provide a random outcome independent of player skill while ensuring that the user's gaming experience (as measured by obstacles/challenges encountered, time of play and other factors) is shaped by the player's skill. Hybrid games also provide for players to gain entry into subsequent competitions through the accumulation of game world credits (GWCs) that accrue as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue. A credit tax function module in accordance with many embodiments can be utilized across a network to collect credit contributions from a hybrid game.

A system diagram showing a number of networked hybrid games that are in accordance with an embodiment is illustrated in FIG. 1. The system 100 includes numerous hybrid games 102, each connected with a credit tax function (CTF) module 104. In several embodiments, the credit tax function modules 104 that regulate the hybrid games are monitored by a credit tax function system server (CTMS) 110. In various embodiments, the hybrid games may be implemented on various types of devices, including land-based hybrid games installed in a casino or other traditional gaming establishment, Internet-based hybrid games that are deployed on a video gaming console or personal computer, mobile-based hybrid games, etc. In the illustrated embodiment, the hybrid games 102, credit tax function modules 104 and credit tax function system server 110 communicate via a network. In several embodiments, hybrid games 102 can be connected by a network 106 on a casino floor, and/or be connected to a network (such as a wide area network) to an credit tax function system server 110 which can control various aspects of the hybrid gaming environment, provide taxation body monitoring, financial accounting and forms of frequent player monitoring for marketing purposes. In various embodiments, the network 106 is the Internet. In many embodiments, a credit tax function system can include one or more credit tax function modules 104 along with one or more credit tax function system servers 110, which collect data and coordinate the activities of the credit tax function modules 104.

Although a specific system architecture for a regulated hybrid game is discussed above, any of a variety of system architectures of a regulated hybrid game can be utilized as appropriate to the requirements of a specific application in accordance with numerous embodiments. In many embodiments, aspects of the regulated hybrid game may be distributed over one or more pieces of hardware and/or software, such as some elements running on a remote server, or on a server in the "cloud" (located over the Internet in a different location). In many embodiments, a credit tax function module and/or credit tax function system contains a hardware and/or software system that accepts data from a hybrid game to which it is connected and performs credit tax functions during the live operation of a hybrid game. Certain embodiments include storage of game reference profiles and an analysis module (each of which are discussed below) in a centralized server, leaving other data collection and log file storage local with the actual physical hybrid game. Credit contribution of a hybrid game from a credit tax function module utilizing taps and control signals in accordance with various embodiments of the invention are discussed below.

Credit Contribution from Hybrid Games

Credit tax function modules in accordance with many embodiments of the invention can utilize taps to obtain information concerning a hybrid game. The information garnered from the taps can be utilized to analyze the hybrid game and to provide for credit contributions from the hybrid games. In some embodiments, the taps are located within the hybrid game's control logic. The taps collect data from the hybrid game and forward the data to the credit tax function. In other embodiments, the taps are part of message communication control logic of a host hosting the hybrid game. The message communication control logic traps messages sent between components of the hybrid game and transmits these messages to the credit tax function. In yet other embodiments, the taps are included in control logic that reads game state data and resource data stored and used by the hybrid game and transmits the read game state data and resource data to the credit tax function during the operation of the hybrid game.

Figure 2:
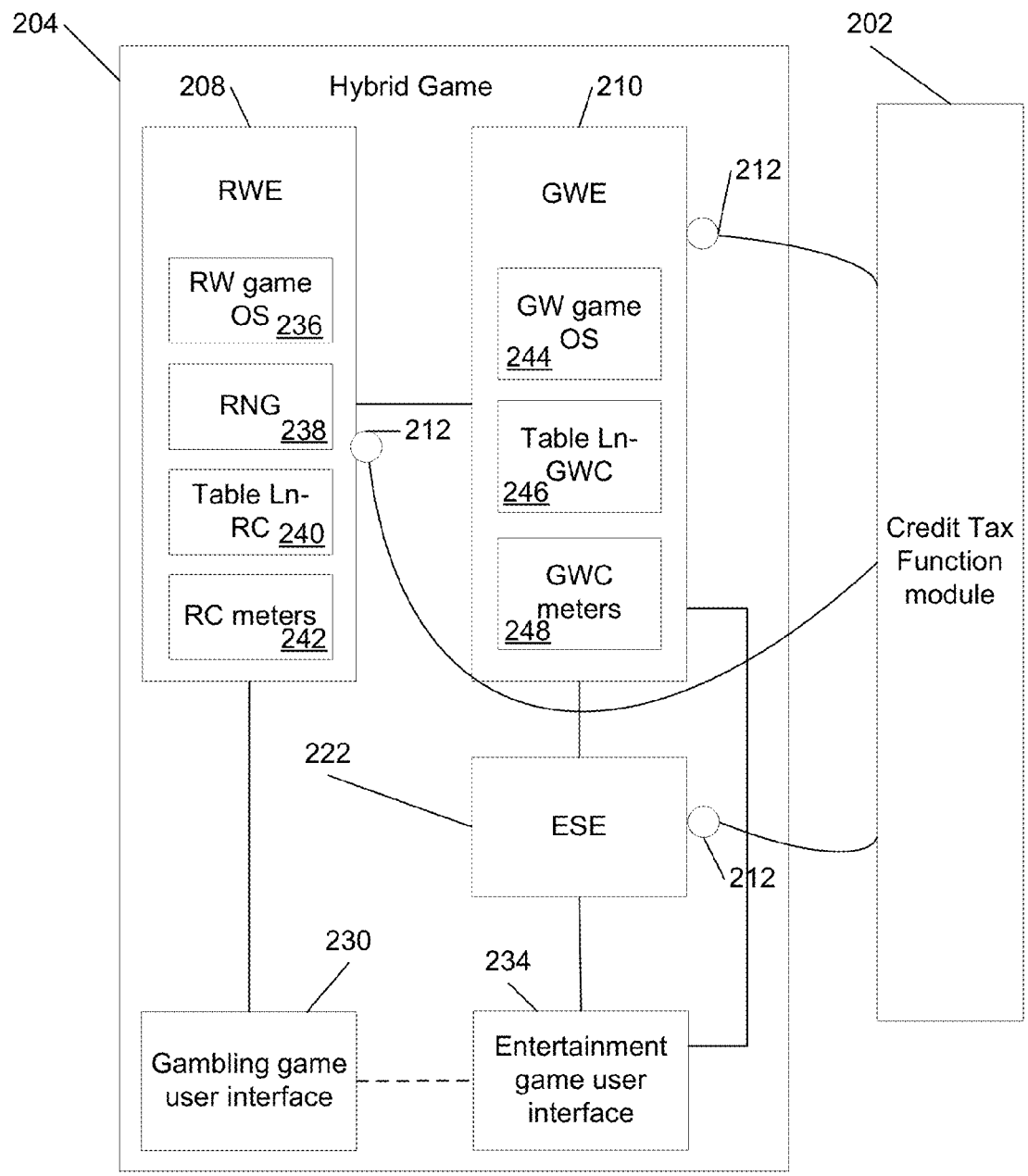
FIG. 2 illustrates the placement of taps and within a credit tax function hybrid game in accordance with an embodiment of the invention.

A conceptual diagram illustrating the placement of taps within the electronics of a hybrid game to enable a credit tax function module to monitor the hybrid game in accordance with an embodiment is illustrated in FIG. 2. The hybrid game 204 includes a RWE 208, GWE 210 and ESE 222 and gambling game user interface 230 and entertainment game user interface 234. The two user interfaces may be part of the same user interface but are separate in the illustrated embodiment. The credit tax function module 202 can intersperse taps 212 to monitor any portion of the hybrid game 204, such as directly at the RWE 208, GWE 210, ESE 222, or at the user interface for the gambling game 230 or the entertainment game 234. These taps allow the credit tax function module 202 to aggregate and analyze data concerning the hybrid game to provide for credit contributions from the hybrid game. In many embodiments, the credit tax function module 202 is implemented as a plurality of separate modules that communicate with an credit tax function system server. The RWE 208, GWE 210, ESE 222 and the credit tax function module 202 are discussed further below.

In several embodiments, The RWE 208 functions as an operating system for the gambling game of the hybrid game 204 and controls and operates the gambling game. The operation of a gambling game is enabled by real funds, accretes and declinates real gambling credits based on random gambling outcome, and whose gambling proposition is typically regulated by gaming control bodies. In many embodiments, the RWE 208 includes a real world (RW) operating system (OS) 236, random number generator (RNG) 238, level "n" real-world credit pay tables (Table Ln-RC) 240, RC meters 242 and other software constructs that enable a game of chance to offer a fair and transparent gambling proposition, and to include the auditable systems and functions that can enable the game to obtain gaming taxation body approval.

A random number generator (RNG) 238 includes software and/or hardware algorithms and/or processes that are used to generate random or pseudorandom outcomes. A level n real-world credit pay table (Table Ln-RC) 240 is a table that can be used in conjunction with a random number generator to dictate the real world credits (RC) earned as a function of game play and is analogous to the pay tables used in a conventional slot machine. Table Ln-Rc payouts are independent of player skill. There may be one or a plurality of Table Ln-Rc pay tables contained in a gambling game, the selection of which may be determined by game progress a player has earned, and bonus rounds which a player may be eligible for. Real world credits (RC) are credits analogous to slot machine game credits which are entered into a gambling game by the user, either in the form of hard currency or electronic funds. RCs can be decremented or augmented based on the outcome of a random number generator according to the Table Ln-Rc real world credits pay table, independent of player skill. In certain embodiments, an amount of RC can be required to enter higher ESE game levels. RC can be carried forward to higher game levels or paid out if a game cash out is opted for by a player. The amount of RC required to enter a specific level of the game "level n" need not be the same for each level.

In many embodiments, the GWE 210 manages the overall hybrid game operation, with the RWE 208 and the ESE 222 effectively being support units to the GWE 210. In several embodiments, the GWE 210 contains mechanical, electronic and software system for an entertainment game. The GWE includes a game world (GW) game operating system (OS) 244 that provides control of the entertainment game. The GWE additionally contains a level "n" game world credit pay table (Table Ln-GWC) 246 indicating where to take input from this table to affect the play of the entertainment game. The GWE can further couple to the RWE 208 to determine the amount of RC available on the game and other metrics of wagering on the gambling game (and potentially affect the amount of RC in play on the RWE 208). The GWE additionally contains various audit logs and activity meters (such as the GWC meter 248). The GWE can also couple to a centralized server for exchanging various data related to the player and their activities on the game. The GWE furthermore couples to the ESE 222.

In many embodiments, a level "n" game world credit pay table (Table Ln-GWC) 246 dictates the GWC earned as a function of player skill in the nth level of the game. The payouts governed by this table are dependent upon player skill and game play at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each game has one or more scoring criterion, embedded within the Table Ln-GWC 246 that reflects player performance against the goal(s) of the game. GWC can be carried forward from one level of game play to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In some embodiments, the operation of the GWE 210 does not affect the RWE's 208 gambling operation except for player choice parameters that are allowable in slot machines today, such as the wager amount, how fast the player wants to play (by pressing a button or pulling the slot's handle), agreement to wager into a bonus round, etc. In this sense, the RWE provides a fair and transparent, non-skill based gambling proposition co-processor to the GWE. In the illustrated embodiment, the communication link shown between the GWE 210 and the RWE 208 allows the GWE 210 to obtain information from the RWE 208 as to the amount of RC available in the gambling game. The communication link can also convey a necessary status operation of the RWE (such as on-line or tilt). The communication link can further communicate the various gambling control factors which the RWE 208 uses as input, such as the number of RC consumed per game or the player's election to enter a jackpot round. In FIG. 2, the GWE 210 is also shown as connecting to the players user interface directly, as this may be necessary to communicate certain entertainment game club points, player status, control the selection of choices and messages which a player may find useful in order to adjust their entertainment game experience or understand their gambling status in the RWE 208.

In various embodiments, the ESE 222 manages and controls the visual, audio, and player control for the entertainment game. In certain embodiments, the ESE 222 accepts input from a player through a set of hand controls, and/or head, gesture, and/or eye tracking systems and outputs video, audio and/or other sensory output to a user interface. In many embodiments, the ESE 222 can exchange data with and accept control information from the GWE 210. In several embodiments an ESE 222 can be implemented using a personal computer (PC), a mobile device such as a smartphone, a tablet computer, a personal digital assistant, a Sony PlayStation® (a video game console developed by Sony Computer Entertainment of Tokyo Japan), or Microsoft Xbox® (a video game console developed by Microsoft Corporation of Redmond, Wash.) running a specific game program.

The ESE 222 operates mostly independently from the GWE 210, except that via their interface, the GWE 210 may send certain GW game control parameters to the ESE 222 to affect the entertainment game's play, such as (but not limited to) what level of character to be used, changing the difficulty level of the game, changing the type of game object, such as a gun or a car, in use, requesting potions to become available or to be found by the character, etc. The ESE 222 can accept this input from the GWE 210, make adjustments, and continue the play action all the while running seamlessly from the players perspective. The ESE's 222 operation is mostly skill based, except for where the ESE's algorithm may inject complexities into the game by chance in its normal operation to create unpredictability in the entertainment game. Utilizing this interface, the ESE may also communicate player choices made in the game to the GWE 210, such as selection of a different gun, the player picking up a special potion in the GW environment, etc.

In other embodiments, operation of an entertainment game of a hybrid game by a player consumes one or more enabling elements (EEs) within the entertainment game. An EE is an element that is consumed by, traded or exchanged in, operated upon, or used to enable the entertainment game portion of the hybrid game. There may be one or more types of EE present in the hybrid game's entertainment game.

Examples of EE include bullets in a shooting game, fuel in a racing game, letters in a word spelling game, downs in a football game, potions in a character adventure game, character health points, etc. The GWE can associate consumption of an EE with the commitment or wager of RC to a gambling game of the hybrid game whereby commitment or wagering of the RC in the gambling game is coordinated with the consumption of the EE in the entertainment game because of actions of the player. Furthermore, the GWE can provide an increment or decrement of EE available to the player in coordination with the gambling outcome of the gambling game such as by incrementing the EE when RC is won or decrementing EE when RC is lost.

The GWE's job in this architecture, being interfaced thusly to the ESE, is to allow the transparent coupling of entertainment software to a fair and transparent random chance gambling game, providing a seamless perspective to the player that they are playing a typical popular entertainment game (which is skill based). In certain embodiments, the ESE 222 can be used to enable a wide range of games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.), etc.). Providers of such software can provide the previously described interface by which the GWE 210 can request amendments to the operation of the ESE software in order to provide the seamless and sensible operation of the hybrid game as both a gambling game and an entertainment game.

In several embodiments, the RWE 208 can accept a trigger to run a gambling game in response to actions taken by the player in the entertainment game as conveyed by the ESE 222 to the GWE 210, or as triggered by the GWE 210 based on the GWE's control logic, in the background to the overall game from the player's perspective, and can provide information to the GWE 210 to expose the player to certain aspects of the gambling game, such as (but not limited to) odds, amount of RC in play, and amount of RC available. The RWE 208 can accept modifications in the amount of RC wagered on each individual gambling try, or the number of games per minute the RWE 208 can execute, entrance into a bonus round, and other factors, all the while these factors can take a different form than that of a typical slot machine. An example of a varying wager amount that the player can choose might be that they have decided to play with a more powerful character in the game, or having a more powerful gun, a better car, etc. These choices can increase or decrease the amount wagered per individual gambling game, in the same manner that a standard slot machine player may decide to wager more or less credits for each pull of the handle. In several embodiments, the RWE 208 can communicate a number of factors back and forth to the GWE 210, via their interface, such as an increase or decrease in a wager being a function of the player's decision making as to their operational profile in the entertainment game (i.e. power of the character, gun selection, car choice, etc.). In this manner, the player is always in control of the per game wager amount, with the choice mapping to some parameter or component which is applicable to the entertainment game experience of the hybrid game. In a particular embodiment, the RWE operation can be a game of chance running every 10 seconds where the amount wagered is communicated from the GWE 210 as a function of choices the player makes in the operation profile in the entertainment game such as those cited above.

In many embodiments, a hybrid game integrates a video game style gambling machine, where the gambling game (i.e. RWE 208 and RC) is not player skill based, while at the same time allows players to use their skills to earn club points which a casino operator can translate to rewards, tournaments opportunities and prizes for the players. The actual exchange of monetary funds earned or lost directly from gambling against a game of chance, such as a slot machine, is preserved. At the same time a rich environment of rewards to stimulate "gamers" can be established with the entertainment game. In several embodiments, the hybrid game can leverage very popular titles with "gamers" and provides a sea change environment for casinos to attract players with games that are more akin to the type of entertainment which a younger generation desires. In various embodiments, players can use their skill towards building and banking GWC which in turn can be used to win tournaments and various prizes as a function of their "gamers" prowess. Numerous embodiments minimize the underlying changes needed to the aforementioned entertainment software (Gears of War, etc.), for the hybrid game to operate within an entertainment game construct, thus making a plethora of complex game titles and environments, rapid and inexpensive to deploy in a gambling environment.

In several embodiments, a taxation scanning and screening audit (CTF) 202 module protects against unauthorized activities in a hybrid game (such as cheats). The credit tax function module 202 can receive information from the hybrid game from taps 212 and control the hybrid game with control signals 218. A tap 212 can be a point from which an credit tax function module gathers information concerning the hybrid game. In the illustrated embodiment, numerous taps 212 are utilized by the credit tax function 202 module to gather information concerning the hybrid game 204. The credit tax function module 202 can tap aspects of the electronics that enable the gambling game, such as the RWE 208, communication between the RWE 208 and the gambling game user interface 230, and/or the gambling game user interface itself 230. Likewise, the credit tax function module 202 can tap 212 aspects of the electronics that enables the entertainment game, such as the GWE 210, ESE 222, entertainment game user interface 234 or communication between the GWE 210 and ESE 222, or between the ESE 222 and the entertainment game user interface 234. Likewise, the credit tax function module 202 can tap 212 communication between the RWE 208 and GWE 210. The information concerning the hybrid game garnered through taps enables the credit tax function module to collate and analyze the data to determine what credit contributions should be made.

In many embodiments, a credit tax function module 202 can be part of an credit tax function system including a server connected via a network to a plurality of credit tax function modules, where the credit tax function system can be in the Cloud or housed in a separate discrete sever and where the credit tax function modules can be separate physical devices, or processes running in a larger piece of software, or any variation thereof. In several embodiments, a credit tax function module 202 is connect to a credit tax function system over a secure interface.

Although specific taps 212 and control signals 218 are discussed above, any of a variety of taps 212 and/or control signals 218 can be utilized by a credit tax function module 202 as appropriate to the requirements of a specific application in accordance with embodiments of the invention.

In numerous embodiments of a hybrid game, a video game style gambling machine could be implemented, where the gambling portion of the game (i.e. RWE and RC) is not player skill based, while at the same time allows players to use their skills to earn club points which a casino operator can translate to rewards, tournaments opportunities and prizes for the players. The actual exchange of monetary funds earned or lost directly from gambling against a slot machine is preserved, while at the same time a rich environment of rewards to stimulate "gamers" can be established.

In many embodiments, the hybrid game architecture leverages very popular titles with "gamers" and provides a sea change environment for casinos to attract players with games that are more akin to the type of entertainment which a younger generation desires.

In various embodiments, players use their skill towards building and banking GWC which in turn is to win tournaments and various prizes as a function of their "gamers" prowess.

In many embodiments, the underlying changes needed to an entertainment game software (Gears of War, etc.) is minimized, for the software to operate within the gaming construct, thus making a plethora of complex game titles and environments, rapid and inexpensive to deploy in a gambling environment.

In numerous embodiments, a hybrid game construct allows players to be incented to accumulate GWC. There are a number of goals a player may have for accumulating GWC and thus have this incentive. Some examples of these goals may have to do with a player seeking to upgrade their characters or enterprises in the game space, or to provide for better equipment and outfitting of these characters and enterprises. Other players may achieve satisfaction of stature based on their ranking within the game player's community. In some embodiments, an incentive will revolve around some kind of prize or monetary award for accumulating a threshold of GWC or winning (or placing) within a tournament. In various embodiments, a method for putting up the money for prizes and cash awards would be a casino dedicating a certain amount of a budget from a department in order to fund the costs. Various embodiments of the invention provide tools to accomplish gathering the credits or funds for these awards. Many embodiments provide for a method, consistent with the hybrid game construct, for automatically funding a prize and award pool from the community of players playing the hybrid games. Award pool funding could be segmented simply, meaning an entire casino's operations population of hybrid games would contribute to a common pool, or segmentation could be more sophisticated where classes of hybrid games (such as word games, shooter games, strategy games, etc.) could contribute to separate pools used for awards for players of those respective games.

Credit Tax Function Module

Figure 3:
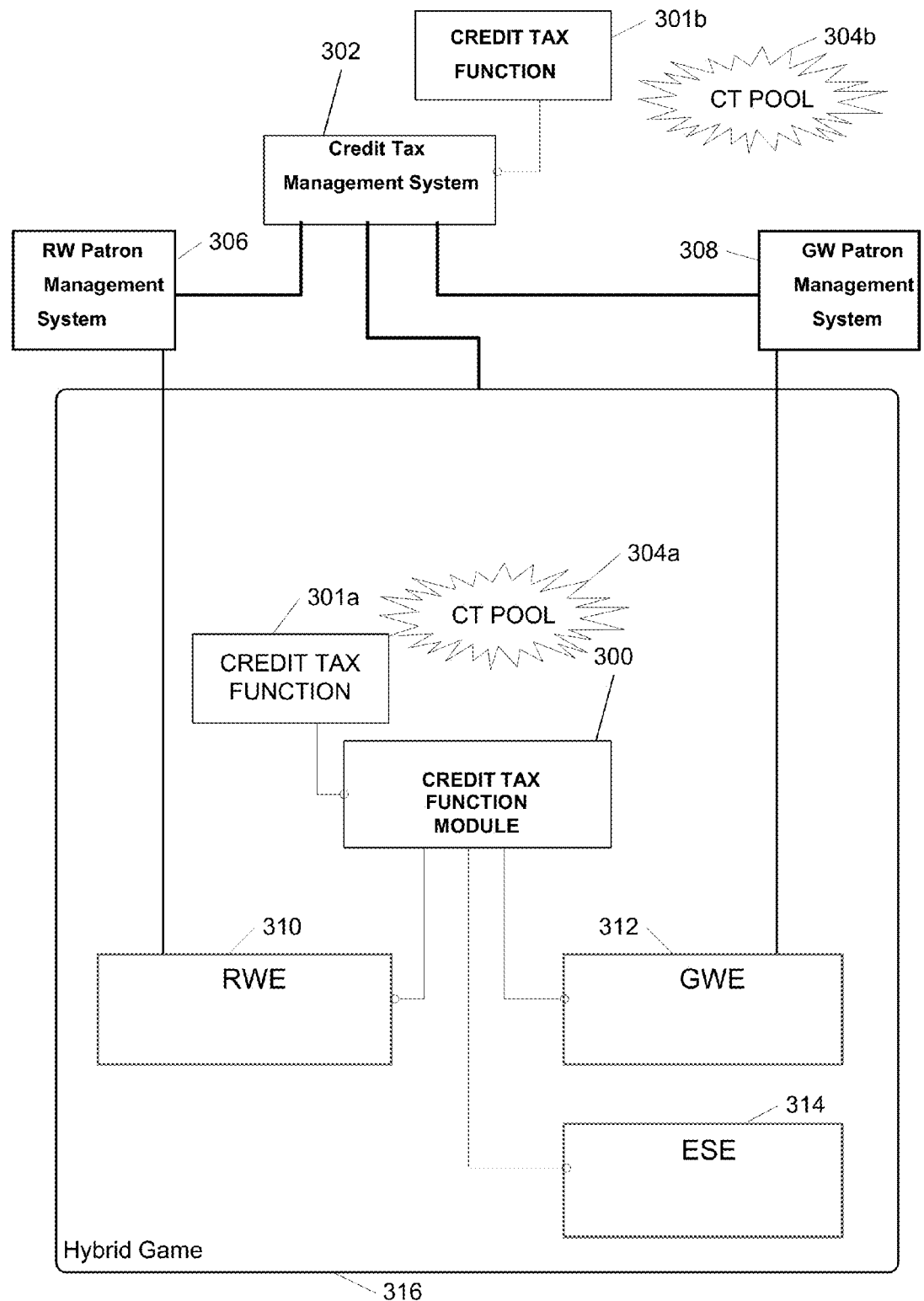
FIG. 3 illustrates the functions of a credit tax function module in accordance with an embodiment of the invention.

FIG. 3 illustrates the functions of a credit tax function module in accordance with an embodiment of the invention. FIG. 3 illustrates the functional relationship between a credit tax function module 300 and the elements, namely an RWE 310, a GWE 312 and an ESE 314 of a hybrid game 316 construct with the addition of a credit tax function (CTF) 301*a* and 301*b*, a credit tax management system (CTMS) 302, a credit tax pool (CTP) 304*a* and 304*b*, and alternate arrangements for the CTF and CTP. The function of the CTF added to the hybrid game and/or system is to effectively collect a "tax" of credits used in the hybrid game, either RC, GWC or both, based on algorithms and formulae established in the game design and contained in the CTF. The CTF could either be a separate construct executing with its own operating system in the game, or be a function contained in the RWE, GWE and/or the ESE. In various embodiments, the CTF may not exist in the hybrid game at all, but rather exists in an external system to which one or more hybrid games are connected, such as an RW management system 306, a GWE management system 308, some other system, or a system dedicated to the CTF, namely the CTMS. The segmentation of where the CTF actually exists may be driven by logical design, or may be a requirement driven either casino operators and/or regulatory bodies. It should be understood by those skilled in the art that the CTF function, the hybrid game, hybrid game connected system, and the CTMS (if it exists as a discrete system), are flexible enough to allow the CTF function to exist within any one or more of these elements.

The operation of the CTMS 302, and thus the CTF and financial management of the hybrid games, may be carefully monitored and controlled by a casino operator, and thus the ability to tailor the CTF and the resulting CTP for the operation will be desirable. In some embodiments, the CTF is operably connected to the CTMS and accepts signaling and controls from the CTMS in regards to reprogramming the CTF's operations, adjusting the formulae, algorithms and taxes the CTF is to levy, and other operational and functional modes the CTF supports.

In numerous embodiments, there are a number of methods, which can be used singularly or in combination, by which the CTF could go about collection of credits for contribution to the CTP. A non-exhaustive list of examples of CTF "taxing" Include:

Taking a percentage of the RC bet for each RC bet placed. In the event of this type of tax, the RWE might make adjustments to its pay-out odds, or use other means, so that small fractions of a bet could be extracted. An example of this would be if a player were to bet 1 credit, and a 0.05% tax were to be extracted on each bet, the odds to win a return on the best would have to be slightly adjusted in order to levy this small amount of tax on a single bet. Such adjustments would naturally have to be disclosed to the player in some manner as would be required by regulatory authorities.

Taking a percentage of the RC won on a game. For instance, if a player were to win 100 RC, and the CTP tax was 1% for a jackpot this size, then the CTF would release 99 RC to the game credits and 1 RC would be allocated to the CTP.

Another method for taxing bets placed or bets won would be to aggregate partial credits taxed across multiple games played and/or multiple sessions as a function of the player in question, and to collect the tax at such time that the partial credits summed to a whole number of credits.

Taking a fixed amount of RC, in addition to the amount of RC wagered, in order for a player to place a bet, either in the real world context of direct gambling, or in a virtual casino in the entertainment/skill portion of the game.

Taking a percentage of the GWC earned in a entertainment/skill portion of the game. For instance, if a player were to earn 300 GWC as a function of a feat, and the CTP tax was 2.5% on this type of credit, then 292 GWC would be allocated to the player's GWC total, and 8 GWC would be consumed by the taxing system (rounded up). It should be noted that since the total GWC population in existence inevitably leads to a casino operator obligation, so taxing GWC could be one method for supporting funding of awards for the player community.

Charging a player a certain amount of RC or GWC in order to undertake a feat or effort in the game. In this type of tax, the game may present the player with a challenge, such as picking a lock on a chest in a dungeon game. It's implied that the chest may have something of value in it. In order to attempt to pick the lock, the player must agree to spend so much RC, GWC or both. There is a chance applied to the attempt, which may or may not successfully pick the lock and open the chest. The fees paid in this example for the attempt would be funded to the CTP.

Charging an entry fee to enter a tournament, charged in RC, GWC or both.

A time based tax system. In this case, a player is taxed for increments of time on the game, or is taxed at predetermined intervals. RC, GWC or both could be taxed in this manner and contributed to the CTP.

In numerous embodiments, a CTF incorporates rounding functions in order to maintain unit credit accounting.

In some embodiments, the CTF taxing function on credits bet, won or earned may not be linear in nature. That is to say, the CTF may be configured so that taxes are weighted heavier towards bets, jackpots and game awards of a certain size than they are to their counterparts.

In various embodiments, CTF taxing function on players of a certain skill may not be linear in nature. That is to say, the CTF may be configured so that taxes are weighted heavier towards players of a certain skill level than they are to their counterparts.

As described above, there can be a number of ways to embed or isolate the CTF, the CTP and the CTMS and those skilled in the art of systems will understand that the CTMS may include many different forms of segmentation and integration. In many embodiments, CTMS would be tasked with collection of "taxes" in the various manners described above (to cite a few possibilities). In various embodiments, the CTMS is interfaced to the casino's financial systems so that clear accounting for the CTP would be known, and this information could in turn be used to set and program the various payouts and prizes available for GWC redemption and tournaments wins. In some embodiments, these same financial systems would be connected to the RC management system and the GWE management system so that RC and GWC in float would be known as well. Based on this information, and market forces, a casino may elect to raise all funds necessary for funding prizes, awards and redemptions from the player community, either in total or in segments as discussed above, or it may choose to raise some of the funds needed from CFT taxation and contribute the balance from budgets established for this purpose.

In numerous embodiments, there may be other forms of credits in a hybrid game which the CTF could tax. In some embodiments, either separately or in combination with credit taxation, the consumable commodity of the entertainment game in play, namely the EE, may also be something upon which the CTF performs taxation for contribution to the CTP.

Figure 4:
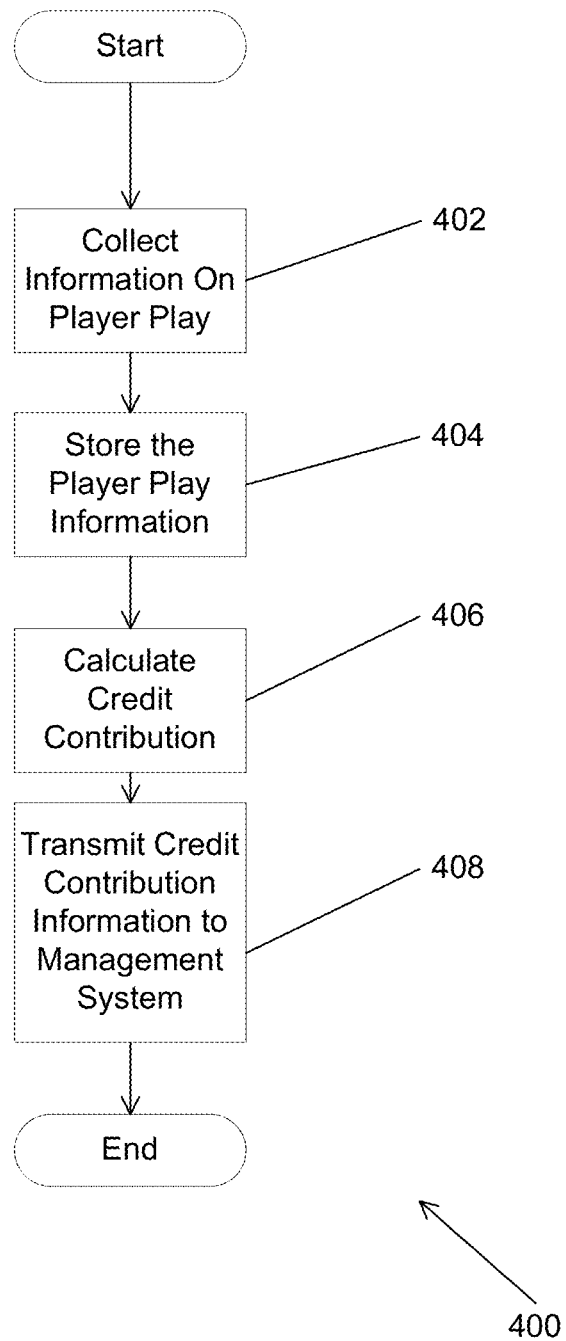
FIG. 4 illustrates a flow chart of hybrid game utilizing credit tax function module in accordance with an embodiment of the invention.

FIG. 4 illustrates a flow chart of hybrid game utilizing credit tax function module in accordance with an embodiment of the invention. The process 400 includes collecting (402) information regarding player play of a hybrid game from the hybrid game through taps. In certain embodiments, the information collected from these taps can relate to player actions (including player actions on its user interface), decisions, skill parameters or entertainment game operation metrics of a plurality of functions (scores, scores for actions, game time clocks, word spell letters, shots, accuracy, weapon types, potion types, game character parameters, health points, game object speed, etc.), and commitment, loss and accumulation of RC and GWC. After collecting (402) the information, the credit tax function module stores (404) the information. In many numerous embodiments, a credit tax function module stores a record of a game session or an internal ESE entertainment game status. After storing (404) the information, the information is used to calculate a credit contribution using any of the methods described herein. After calculating the appropriate credit contribution, the credit tax function module transmits the calculated credit contribution to an appropriate management system as described herein.

In additional embodiments, a credit tax function module can retrieve pre-stored information related to hybrid game sessions, including but not limited to audit logs, time stamped events, analysis, and raw performance and operation data, and sends the data to an credit tax function system to which it is connected. In other embodiments, a credit tax function module retrieves pre-stored information related to hybrid game sessions, including but not limited to audit logs, time stamped events, analysis, and raw performance and operation data, and sends the data to a removable memory device.

Although a specific credit tax function module is discussed above, any of a variety of credit tax function modules can be utilized as appropriate to the requirements of a specific application in accordance with embodiments of the invention. In numerous embodiments, various components of the credit tax function module can be implemented in either hardware or software. In certain embodiments, some or the entire credit tax function module may exist as software in the GWE, the hybrid game or a server to which the hybrid game is connected. In a number of embodiments, the hybrid game itself to which the credit tax function module interfaces may exist in the cloud or a remote sever, and in such implementations, the entire credit tax function, or portions thereof, including data collection taps, may only be comprised solely of software running on a server or in the cloud, or some variation thereof. Exemplary operating modes and functions of a credit tax function module are discussed below.

Processing Apparatus

Figure 5:
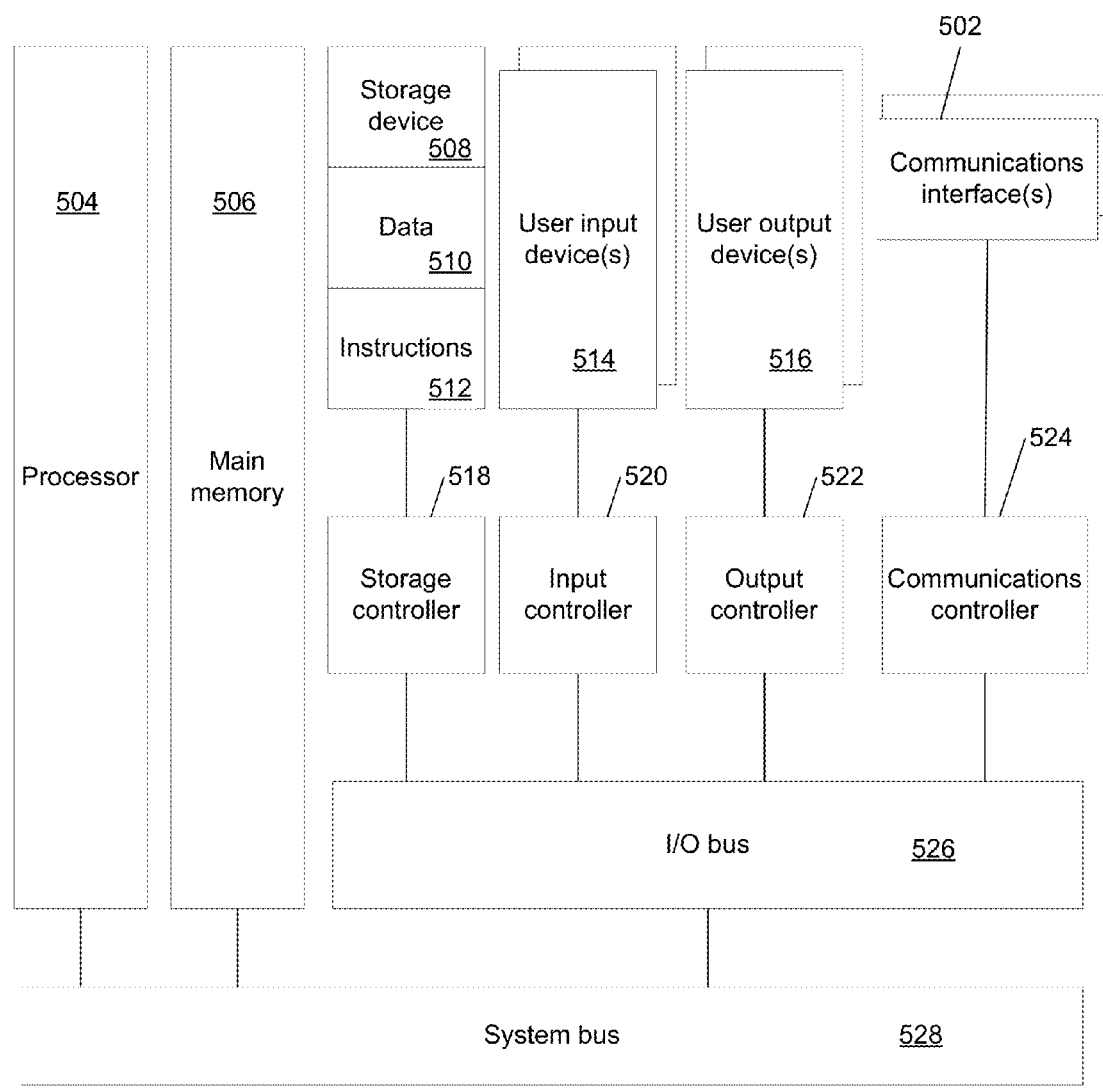
FIG. 5 illustrates a hardware architecture diagram of a processing apparatus in accordance with an embodiment of the invention.

Any of a variety of processing apparatuses can host various components of a credit contribution hybrid gaming system in accordance with embodiments of the invention. In several embodiments, these processing apparatuses can include, but are not limited to, a gaming machine, a general purpose computer, a personal computing device, a smartphone and/or a controller. A processing apparatus in accordance with various embodiments of the invention is illustrated in FIG. 5. In the processing apparatus 500, a processor 504 is coupled to a memory 506 by a bus 528. The processor 504 is also coupled to non-transitory processor-readable storage media, such as a storage device 508 that stores processor-executable instructions 512 and data 510 through the system bus 528 to an I/O bus 526 through a storage controller 518. The processor 504 is also coupled to one or more interfaces that may be used to connect the processor to other processing apparatuses as well as networks as described herein. The processor 504 is also coupled via the bus to user input devices 514, such as tactile devices like keyboards, keypads, foot pads, touch screens, trackballs, etc., as well as non-contact devices such as audio input devices, motion sensors and motion capture devices, etc. that the processing apparatus may use to receive inputs from a user when the user interacts with the processing apparatus. The processor 504 is connected to these user input devices 514 through the system bus 528, to the I/O bus 526 and through the input controller 520. The processor 504 is also coupled via the bus to user output devices 516 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 528 to the I/O bus 526 and through the output controller 522. The processor 504 can also be connected to a communications interface 502 from the system bus 528 to the I/O bus 526 through a communications controller 524.

In various embodiments, a processor loads the instructions and the data from the storage device into the memory and executes the instructions and operates on the data to implement the various aspects and features of the components of a credit contribution hybrid game gaming system as described herein. The processor uses the user input devices and the user output devices in accordance with the instructions and the data in order to create and operate user interfaces for players, casino operators, owners, etc. as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as a USB memory device, an optical CD ROM, magnetic media such as tape or disks, etc. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an credit tax function module, credit tax function system, an RWE, a GWE and an ESE as described herein can be implemented on one or more processing apparatuses, whether dedicated, shared or distributed in any combination thereof, or may be implemented on a single processing apparatus. In addition, while certain aspects and features of a gaming and taxation monitoring system described herein have been attributed to an credit tax function module, credit tax function system, an RWE, a GWE or an ESE, these aspects and features may be implemented in a hybrid form where any of the features or aspects may be performed by any of an credit tax function module, credit tax function system, an RWE, a GWE or an ESE within a gaming system without deviating from the spirit of the invention.

While the above description contains many specific embodiments of the invention, these should not be construed as limitations on the scope of the invention, but rather as an example of one embodiment thereof. It is therefore to be understood that the invention may be practiced otherwise than as specifically described, without departing from the scope and spirit of the invention. Thus, embodiments of the invention should be considered in all respects as illustrative and not restrictive.

What is claimed is:

1. A tournament gaming system comprising:
at least one processor configured to execute a tournament gaming system configured to:
connect to a first hybrid game wherein the first hybrid game provides a first entertainment game portion coupled to a gambling game portion;
receive information of skilled player actions taken by a player from the first hybrid game, wherein the skilled player actions include consumption of an element within the first entertainment game portion of the first hybrid game to a commitment and triggering of a wager of real world credits in the gambling game portion of the first hybrid game, wherein a wager outcome of the wager is based on an outcome of a random number generator, a paytable, and the commitment and triggering of the wager in response to the skilled player actions taken by the player while playing the first entertainment game portion of the first hybrid game;
use the wager outcome to alter subsequent gameplay in the first entertainment game portion of the first hybrid game;
collect a portion of the wager of real world credits committed to the gambling game portion of the first hybrid game in response to the skilled player actions taken by the player while playing the first entertainment game portion of the first hybrid game;
accrue first game world credit earned by the player for the player's skilled player actions taken during skillful play of the first entertainment game portion of the first hybrid game during the consumption of the element and triggering of the wager of real world credits committed to the gambling game portion of the first hybrid game, wherein the game world credits are earned or depleted as a function of player performance in the context of the entertainment game portion of the first hybrid game;
enter the player into a hybrid game tournament on the basis of the accumulated first game world credit earned through skillful play of the first entertainment game portion of the first hybrid game;
generate a display of information of the player's entrance into the hybrid game tournament; and
contribute the collected portion of the wager of real world credits to a pool, the pool contributed to an award for redemption of second game world credit earned by the player during the player's play of a second entertainment game portion of a second hybrid game in the hybrid game tournament,
whereby the tournament gaming system enters the player into the hybrid game tournament on the basis of the player's skill at playing the first entertainment game portion of the first hybrid game, and contributes to the award for redemption of the second game world credit earned by the player in the hybrid game tournament, from the real world credits committed by the player to the gambling game portion of the first hybrid game.

2. The tournament gaming system for a hybrid game of claim 1, wherein the first and second entertainment game portion are the same entertainment game portion and the first and second hybrid games are the same hybrid game.

3. The tournament gaming system for a hybrid game of claim 1, wherein the portion of the wager of real world credits collected is a percentage of real world credit wagered in the first gambling game portion of the first hybrid game during the player's play of the first entertainment portion of the first hybrid game and the percentage is taken directly from the wagered real world credit.

4. The tournament gaming system for a hybrid game of claim 1, wherein the portion of the wager of real world credits collected is a percentage of real world credit wagered in the first gambling game portion of the first hybrid game during the player's play of the first entertainment portion of the first hybrid game and the percentage is taken by adjusting the odds tables of the gambling game portion of the first hybrid game.

5. The tournament gaming system for a hybrid game of claim 1, wherein the portion of the wager of real world credits collected is a percentage of real world credit won in the gambling game portion of the first hybrid game.

6. The tournament gaming system for a hybrid game of claim 1, wherein a percentage portion of game world credit is taken from the first entertainment portion of the hybrid game and contributed to the pool.

7. The tournament gaming system for a hybrid game of claim 1, wherein, the portion of the wager of real world credits is taken on a periodic time basis.

8. The tournament gaming system for a hybrid game of claim 1, wherein the portion of the wager of real world credits is collected for use of the first hybrid game for a certain period of time.

9. The tournament gaming system for a hybrid game of claim 1, wherein the portion of the wager of real world credits collected is a certain amount taken for the player to enter the hybrid game tournament.

10. The tournament gaming system for a hybrid game of claim 1, wherein the portion of the wager of real world credits is a certain amount taken in order for the first player to attempt a specific action in the first entertainment game portion of the first hybrid game.

11. The tournament gaming system of claim 1, wherein the at least one processor configured as the game world controller and the at least one processor configured as the real world controller are constructed using a same processing device.

* * * * *